US012632918B2

(12) United States Patent
Ferrand et al.

(10) Patent No.: US 12,632,918 B2
(45) Date of Patent: May 19, 2026

(54) COMPUTER SYSTEM FOR PROCESSING PIXEL DATA OF AN IMAGE

(71) Applicant: STMicroelectronics (Rousset) SAS, Rousset (FR)

(72) Inventors: Olivier Ferrand, Carry le Rouet (FR); Jean-Francois Link, Trets (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 721 days.

(21) Appl. No.: 18/045,097

(22) Filed: Oct. 7, 2022

(65) Prior Publication Data

US 2023/0126011 A1     Apr. 27, 2023

(30) Foreign Application Priority Data

Oct. 21, 2021    (FR) ...................................... 2111208

(51) Int. Cl.
 *G06T 1/60*          (2006.01)
 *G06F 12/0802*     (2016.01)
 *G06F 12/10*        (2016.01)
(52) U.S. Cl.
 CPC ............ *G06T 1/60* (2013.01); *G06F 12/0802* (2013.01); *G06F 12/10* (2013.01); *G06F 2212/1016* (2013.01)
(58) Field of Classification Search
 CPC ....... G06T 1/60; G06F 12/0802; G06F 12/10; G06F 2212/1016
 See application file for complete search history.

(56) References Cited

U.S. PATENT DOCUMENTS 7,508,398 B1    3/2009  Montrym
9,299,124 B2 *  3/2016  Chen ......................... G06T 1/60
                        (Continued)

FOREIGN PATENT DOCUMENTS

CN       101084493 A    12/2007
CN       104350523 A    2/2015
                        (Continued)

OTHER PUBLICATIONS

Paalanen P., "A programmer's view on digital images: the essentials," Collabora.com, https://www.collabora.com/news-and-blog/blog/2016/02/16/aprogrammers-view-on-digital-images-the-essentials, Feb. 16, 2016, 8 pages.

*Primary Examiner* — Oneal R Mistry
*Assistant Examiner* — Jongbong Nah
(74) *Attorney, Agent, or Firm* — Slater Matsil, LLP

(57)              ABSTRACT
In an embodiment a computer system includes at least one master module configured to process data having a format of N bits, a framebuffer configured to store pixel color component values of an image, the framebuffer having a resolution of N bits, each pixel being coded on P bits in the framebuffer and the pixels being stored one after another in the framebuffer and a memory management unit configured to control memory accesses of the at least one master module to the framebuffer, wherein the memory management unit is further configured to receive read memory access requests from the at least one master module, read at least one pixel in the framebuffer saved on P bits, and modify the format of the at least one read pixel by adding Q additional bits equal to a difference between N and P so as to format the at least one pixel on N bits before transmitting the at least one pixel to the at least one master module.

20 Claims, 2 Drawing Sheets

(56)          References Cited

U.S. PATENT DOCUMENTS

| | | | |
|---|---|---|---|
| 10,819,965 B2 | 10/2020 | Jun | |
| 11,775,443 B2 * | 10/2023 | Sherlock | G06F 12/145 |
| | | | 711/163 |
| 2005/0195200 A1 * | 9/2005 | Chuang | G06F 12/0875 |
| | | | 345/519 |
| 2006/0044603 A1 | 3/2006 | Meeker | |
| 2012/0188460 A1 * | 7/2012 | Mau | G09G 5/001 |
| | | | 348/E9.037 |
| 2014/0139537 A1 * | 5/2014 | Ghosh | G06F 3/14 |
| | | | 345/547 |
| 2015/0097847 A1 * | 4/2015 | Dunaisky | G09G 5/39 |
| | | | 345/531 |
| 2018/0293942 A1 * | 10/2018 | Gu | G09G 3/3291 |

FOREIGN PATENT DOCUMENTS

| | | | |
|---|---|---|---|
| CN | 108377394 A | 8/2018 | |
| CN | 110087082 A | 8/2019 | |
| EP | 2859527 A1 | 4/2015 | |
| WO | 2013184268 A1 | 12/2013 | |
| WO | WO-2021035598 A1 * | 3/2021 | |

* cited by examiner

[Fig 1]
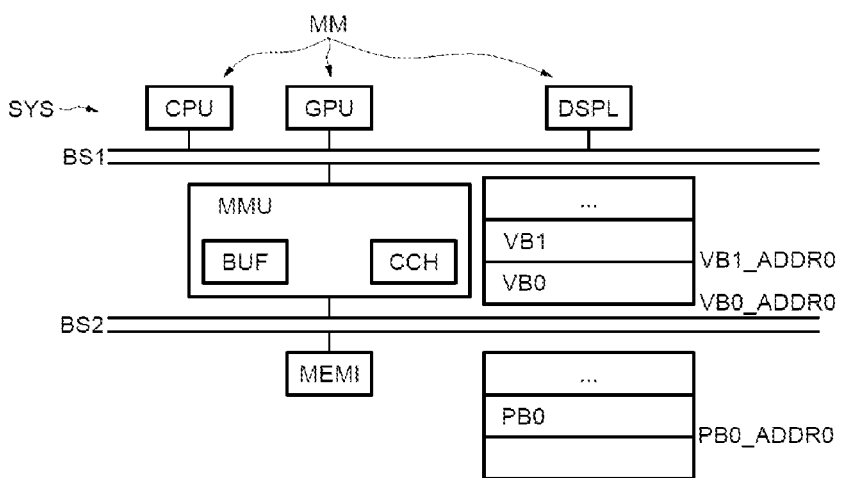
[Fig 2]
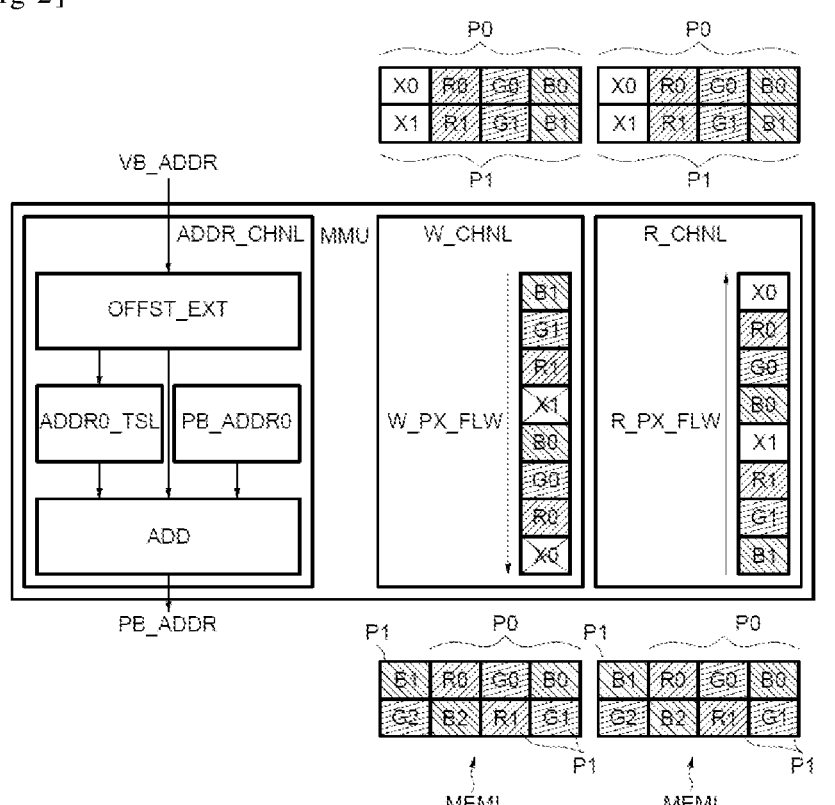

[Fig 3]
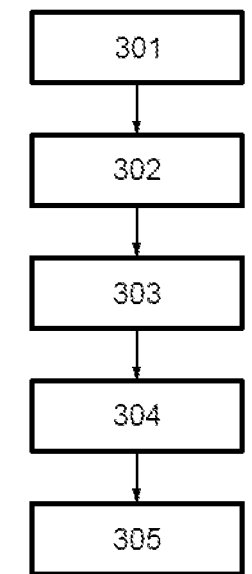
[Fig 4]
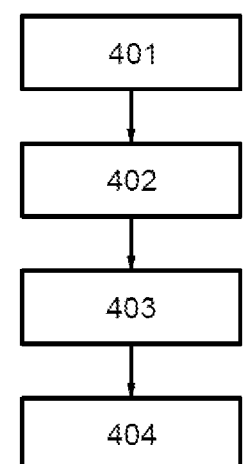

COMPUTER SYSTEM FOR PROCESSING PIXEL DATA OF AN IMAGE

CROSS-REFERENCE TO RELATED APPLICATIONS

This application claims the benefit of French Application No. 2111208, filed on Oct. 21, 2021, which application is hereby incorporated herein by reference.

TECHNICAL FIELD

Embodiments and implementations relate to the management of a framebuffer configured to contain a set of pixels forming a digital image.

BACKGROUND

A digital image consists of a set of pixels. Each pixel is associated with a colour broken down into three colour components: red, green and blue. Each colour component of a pixel is associated with a value usually quantified on a byte (eight bits). Thus, a pixel is usually coded on 24 bits (three times eight bits, that is to say three bytes, one byte per colour).

A computer system is not usually optimised to handle 24-bit data. In particular, a computer system usually comprises a processor configured to carry out operations on 16 bits, 32 bits or 64 bits. Furthermore, the computer system often uses data buses configured to carry data on 32 bits or 64 bits. Nevertheless, a computer system may comprise displays adapted to process 24-bit and 32-bit data.

A computer system usually further comprises a framebuffer for storing colour component values of the pixels of a final image to be displayed on a screen. The framebuffers usually have a 32-bit resolution. Thus, the accesses to such memories may be carried out by 32-bit, 16-bit or 8-bit words. In particular, the access by 32-bit words makes it possible to reduce the number of accesses to the memory. However, the memory also supports writing in 8 or 16 bits to be able to write components of a pixel without corrupting the rest of a word in memory.

Moreover, it is possible to save the colour component values of the pixels in the framebuffer according to two different methods.

SUMMARY

A first method comprises adding for each pixel a byte so that the pixel occupies 32 bits. This method has the drawback of losing a byte for each pixel in the memory but makes it possible to easily obtain all of the colour component values of each pixel because the size of the pixel is adapted to the resolution of the framebuffer.

A second method comprises saving the pixels one after another in order to maximise the occupation of the memory. This method has the drawback of having pixels saved on a plurality of words, due to the fact that the size of the pixels (24 bits) is less than the size of the words (32 bits). This implies a complexification of the accesses to the memory. Indeed, the reading or the writing of pixels in the memory may require a plurality of accesses to the memory. In particular, the reading of a pixel saved on two words in memory requires reading these two words in order to read all of the colour component values of the pixel. Furthermore, master modules of the computer system, such as a graphics processing unit, may not support the processing of 24-bit pixels saved in memory according to this method. Furthermore, the writing of pixels on two words in memory is complex because it is important to avoid corrupting the colour component values of the pixels that share the same words.

Embodiments provide a simple management of pixels in a computer system.

According to one embodiment, a computer system includes at least one master module adapted to process data having an N number of bits—particularly thirty-three bits—, a framebuffer configured to store pixel colour component values of an image, the framebuffer having a resolution of N bits, each pixel being coded on a P number of bits— particularly twenty-four bits, the value of each colour component being coded on eight bits— in the framebuffer, the pixels being stored one after another in the framebuffer, a memory management unit configured to control memory accesses of the at least one master module to the framebuffer, the memory management unit also being configured to:

receive read memory access requests from the at least one master module, then read at least one pixel in the framebuffer saved on P bits, then modify the format of the at least one read pixel by adding thereto a Q number of additional bits equal to a difference between N and P—particularly eight bits, i.e. an additional byte—so as to format the at least one pixel on N bits before transmitting the at least one pixel to the at least one master module, and receive write memory access requests from at least one pixel having a format on N bits including the colour component values of the at least one pixel as well as a Q number of additional bits equal to a difference between N and P—particularly eight bits, i.e. an additional byte—, then modify the format of the at least one pixel by deleting the Q additional bits so as to format the at least one pixel on P bits before saving the at least one pixel in the framebuffer.

Such a system is then adapted to provide a master module with pixels having the same format on N bits based on a P-bit format saved in the framebuffer of N-bit resolution. The N-bit format of the pixels is then adapted to be processed by the master module. Indeed, the pixels in format on N bits may be handled more easily by the master module. Furthermore, the fact of saving the pixels in P-bit format in the framebuffer one after another makes it possible to optimise the occupation of the framebuffer.

Furthermore, if the system comprises a plurality of master modules, all of the master modules have access to the same pixel format. This also makes it possible to simplify the handling of pixels by the various master modules.

Preferably, N is equal to thirty-two, P is equal to twenty-four, the value of each colour component of each pixel being coded on eight bits, so that Q is equal to eight.

In an advantageous embodiment, each memory access request specifies a virtual address corresponding to a physical address to access the framebuffer. The memory management unit is then configured to convert this virtual address into the corresponding physical address of the framebuffer. Virtual address means an address of a virtual buffer seen by the at least one master module. The memory management unit is therefore configured to translate, that is to say make correspond, the addresses of this virtual buffer into a physical address of the framebuffer.

Preferably, the memory management unit comprises at least one buffer configured to store the pixels received from the master module during a write access and the pixels received from the framebuffer during a read access. This buffer is used to save pixels during memory accesses by data burst.

Advantageously, the system further comprises a cache memory configured to store the last read pixel in the framebuffer. This cache memory may be used to reduce the number of read accesses to the memory to be carried out to write a pixel in the framebuffer.

According to another embodiment, a method is proposed for reading at least one pixel in a framebuffer based on a read access request emitted by a master module, the master module being adapted to process data having an N number of bits—particularly thirty-two bits—, and the framebuffer being configured to store pixel colour component values of an image, the framebuffer having a resolution of N bits, each pixel being coded on a P number of bits—particularly twenty-four bits, the value of each colour component being coded on eight bits—in the framebuffer, the pixels being stored one after another in the framebuffer, method comprising:

receiving the read memory access request by a memory management unit configured to control memory accesses from the master module to the framebuffer, reading by the memory management unit the at least one pixel in the framebuffer saved on P bits, then modifying by the memory management unit the format of the at least one read pixel by adding thereto a Q number of additional bits equal to a difference between N and P—particularly eight bits, i.e. an additional byte— so as to format the at least one pixel on N bits, then transmitting the at least one pixel on N bits by the memory management unit to the master module.

According to yet another embodiment, a method is proposed for writing at least one pixel in a framebuffer based on a write access request emitted by a master module, the master module being adapted to process data having an N number of bits—particularly thirty-two bits—, and the framebuffer being configured to store pixel colour component values of an image, the framebuffer having a resolution of N bits, each pixel being coded on a P number of bits—particular twenty-four bits, the value of each colour component being coded on eight bits— in the framebuffer, the pixels being stored one after another in the framebuffer, method comprising:

receiving the write memory access request by a memory management unit configured to control the memory accesses from the master module to the framebuffer, the write access request specifying at least one pixel to write having a format on N bits including the colour component values of the at least one pixel on P bits as well as a Q number of additional bits equal to a difference between N and P—particularly eight bits, i.e. an additional byte—, and modifying by the memory management unit the format of the at least one pixel by deleting the Q additional bits so as to format the at least one pixel on P bits, then—saving by the memory management unit the at least one pixel on P bits in the framebuffer.

BRIEF DESCRIPTION OF THE DRAWINGS

Other advantages and features of the invention will become apparent upon examination of the detailed description of non-limiting implementations and embodiments, and of the appended drawings, wherein:

FIG. 1 illustrates an embodiment of a computer system;

FIG. 2 illustrates an embodiment of the memory management unit;

FIG. 3 illustrates a method for reading at least one pixel in a framebuffer according to embodiments; and FIG. 4 illustrates a method for writing at least one pixel in a framebuffer according to embodiments.

DETAILED DESCRIPTION OF ILLUSTRATIVE EMBODIMENTS

FIG. 1 illustrates an embodiment of a computer system SYS. The computer system SYS comprises a plurality of master modules MM, a framebuffer MEMI, and a memory management unit MMU disposed between the master modules MM and the framebuffer MEMI.

In particular, the computer system SYS comprises a first bus BS1 electrically connecting the master modules to the memory management unit MMU in order to make communication possible between the master modules and the memory management unit MMU. The computer system SYS also comprises a second bus BS2 electrically connecting the framebuffer MEMI to the memory management unit MMU in order to make communication possible between this framebuffer MEMI and the memory management unit MMU. Alternatively, the first bus BS1 and the second bus BS2 may form one and the same bus.

As master module MM, the computer system SYS comprises a processor CPU (that is to say a central processing unit), a graphic processing unit GPU and a display DSPL. The master modules MM are adapted to process data in a format on 32 bits.

The framebuffer MEMI is a physical buffer. The framebuffer MEMI is configured to store the pixels of a final image to be displayed on the DSPL screen. Each pixel is represented by three colour components: red, green and blue. Each component is quantified on 8 bits. Thus, a pixel consists of 24 bits. For example, FIG. 1 illustrates an area PB0 for storing a pixel based on a physical start address PB0_ADDR0.

Furthermore, the 24-bit pixels are saved in the framebuffer MEMI compactly. Thus, each 32-bit word of the memory makes it possible to store four colour component values. Each word makes it possible to store colour components of two pixels. For example, a word may store one colour component of a first pixel and three colour components of a second pixel. Alternatively, a word may store two colour components of a first pixel and two other colour components of a second pixel.

The framebuffer MEMI is read and write accessible.

The master modules MM are configured to emit memory access requests to the framebuffer MEMI. Nevertheless, the framebuffer MEMI may not be accessed directly by the master modules MM. These memory access requests emitted by the master modules MM are thus transmitted to the memory management unit that is configured to manage the memory access requests.

The memory access requests may be read or write access requests to the framebuffer MEMI. The read access requests to the framebuffer are used to read colour components of the pixels stored in the framebuffer MEMI. The write access requests to the framebuffer are used to write pixel colour components in the framebuffer MEMI.

The master modules MM are configured to process data having a format other than that of data saved in the framebuffer. Indeed, as seen above, the master modules MM are adapted to process 32-bit data whereas the pixels in the framebuffer MEMI are formatted on 24 bits.

The memory management unit MMU is adapted to simplify the transactions between the framebuffer MEMI and the master modules MM. In particular, the memory management unit is configured to convert the formats of the data that transit between the master modules MM and the frame-buffer MEMI into formats adapted to the latter.

For this, a virtual buffer is used by the memory management unit MMU. The memory management unit is configured to translate the addresses of the virtual buffer into physical addresses of the framebuffer. Only the virtual buffer is seen by the master modules. Thus, for each access request to the framebuffer, the master modules specify a virtual address to be accessed (that is to say an address of the virtual buffer) to the memory management unit. The virtual buffer has a 32-bit resolution. Thus, four bytes (32 bits) of the virtual buffer correspond to three bytes (24 bits) of the framebuffer. For example, FIG. 1 illustrates two areas VB0 and VB1 making it possible for each to store a pixel based on virtual start addresses VB0_ADDR0 and VB1_ADDR0 respectively.

FIG. 2 illustrates an embodiment of the memory management unit MMU. The memory management unit MMU comprises a channel ADDR_CHNL configured to convert the virtual addresses VB_ADDR of the virtual buffer into physical addresses PB_ADDR of the framebuffer. The memory management unit MMU also comprises a channel W_CHNL making it possible, within the scope of a write access, to modify the 32-bit format of the pixels transmitted by the master module MM into a 24-bit format adapted to the framebuffer MEMI. The memory management unit MMU also comprises a channel R_CHNL making it possible, within the scope of a read access, to modify the 24-bit format of the pixels saved in the framebuffer into a 32-bit format adapted to the master module MM having emitted the access request.

In particular, when the memory management unit authorises a reading of pixels stored in the framebuffer MEMI, the memory management unit MMU is configured to modify the format of the pixels to be read saved in memory in a format adapted to the master module MM. More particularly, the memory management unit MMU is configured to add a byte (8 bits) to each pixel in 24-bit format read in the memory. Thus, the master module MM receives the read pixel in a format on 32 bits comprising three components of the pixel on 24 bits as well as the added byte. The value of the added byte may be programmed arbitrarily.

For example, as illustrated in FIG. 2, the channel R_CHNL receives as input the pixels P0, P1. The pixel P0 is stored in memory and is coded on 24 bits and comprises three colour components R0, G0 and B0. Likewise, the pixel P1 is stored in memory after the pixel P0 and comprises three colour components R1, G1 and B1. In the channel R_CHNL, the memory management unit adds one byte X0 to the pixel P0 and one byte X1 to the pixel P1. In this way, the pixels P0 and P1 that are delivered to the master module MM having emitted the read access request are on 32 bits. The pixel P0 delivered to the master module therefore comprises the components R0, G0, B0 as well as the additional byte X0, and the pixel P1 delivered to the master module therefore comprises the components R1, G1, B1 as well as the additional byte X1.

Furthermore, when the memory management unit MMU authorises a writing of a pixel in the framebuffer MEMI, the master module supplies the pixel in an adapted format of 32 bits to the memory management unit. As indicated above, in this adapted format, the format of the pixel provides 24 bits for the three components of the pixel (8 bits for each component) and an additional byte. The memory management unit MMU is then configured to modify the format of the pixel in a format on 24 bits adapted to the framebuffer MEMI. The memory management unit MMU is thus configured to delete the additional byte of the pixel, in order to only keep the three colour components of the pixel.

For example, as illustrated in FIG. 2, the channel W_CHNL receives as input the pixels P0, P1 delivered by a master module MM. These pixels P0, P1 are on 32 bits. The pixel P0 comprises three colour components R0, G0 and B0 as well as an additional byte X0. Likewise, the pixel P1 comprises three colour components R1, G1 and B1 as well as an additional byte X1. In the channel R_CHNL, the memory management unit deletes the byte X0 from the pixel P0 and the byte X1 from the pixel P1. In this way, the pixels P0 and P1 that are stored in the framebuffer are on 24 bits. In particular, the pixel P0 saved in the framebuffer only comprises the components R0, G0, B0 as well as the additional byte X0, and the pixel P1 saved in the framebuffer only comprises the components R1, G1, B1. The pixels P0 and P1 are then stored one after another in the framebuffer MEMI.

As seen above, the memory access requests emitted by the master modules MM specify a virtual address VB_ADDR. The memory management unit MMU is configured to translate this virtual address VB_ADDR into a physical address PB_ADDR in the channel ADDR_CHNL.

For this, the memory management unit MMU comprises OFFST_EXT means configured to extract an offset of the virtual address VB_ADDR from a colour component of a pixel in relation to a virtual start address of this pixel. Subsequently, the memory management unit MMU further comprises ADDR0_TSL means configured to convert the virtual address of the pixel into a physical start address of this pixel in the framebuffer. In particular, the ADDR0_TSL means are configured to multiply the virtual start address of this pixel by ¾ to obtain the physical start address of this pixel in the framebuffer. The memory management unit also comprises ADD means configured to add the previously extracted offset to the physical start address and to an initial physical address PB_ADDR0 of the framebuffer in order to obtain the physical address PB_ADDR of a colour component of this pixel.

For example, for a RGB (red, green, blue) pixel, in order to obtain the address of the green G component an offset of one byte should be made in relation to the start address of the pixel. In order to obtain the address of the red R component an offset of two bytes should be made in relation to the start address of the pixel. The address of the blue B component corresponds to the start address of the pixel. Thus, if a virtual address of the green G component of a pixel is 0x2019, then the virtual start address of the pixel is 0x2018. The physical start address of the pixel in the framebuffer is therefore 0x1812 (0x2018*¾), if the initial physical address PB_ADDR0 is 0x0000. The physical address of the green component is therefore 0x1813 (0x1812+1).

Moreover, as indicated above, the colour component values of a pixel may be stored separately in two words of the framebuffer MEMI. Therefore, to read or write such a pixel, the memory management unit MMU carries out at least two memory accesses.

In order to optimise the transactions between each master module MM and the framebuffer MEMI, the memory management unit MMU may be configured to manage memory accesses by data bursts. For this, as illustrated in FIG. 1, the memory management unit MMU may comprise at least one buffer BUF for storing the colour components of a plurality of pixels. This buffer BUF makes it possible to store a pixel flow W_PX_FLW or R_PX_FLW as shown in FIG. 2.

Moreover, in order to reduce the individual accesses to the framebuffer MEMI, the memory management unit MMU may comprise a cache memory CCH. This cache memory CCH is then configured to store the last word(s) read by the memory management unit MMU. Thus, this cache memory makes it possible to limit the number of read accesses to the framebuffer to carry out transactions on a pixel. Alternatively, the cache memory CCH may be placed between the memory management unit MMU and the master modules MM.

Such a system is then adapted to provide master modules MM with pixels having the same 32-bit format from a 24-bit format saved in the framebuffer MEMI of 32-bit resolution. The 32-bit format of the pixels is then adapted to be processed by the master modules MM. Indeed, the pixels in 32-bit format may be manipulated more simply by the master module MM. Furthermore, the fact of saving the pixels in 24-bit format in the framebuffer one after another makes it possible to optimise the occupation of the framebuffer MEMI.

FIG. 3 illustrates a method for reading at least one pixel in a framebuffer that may be implemented by the computer system SYS described above.

The method comprises emitting 301 by a master module MM a read access request to the framebuffer. This read access request is transmitted to the memory management unit MMU via the first bus BS1. This read access request specifies a virtual address to be accessed.

Thus, the method comprises receiving 302 the read access request by the memory management unit MMU. The memory management unit MMU then controls the read access request in order to authorise or not the read access to the framebuffer MEMI.

If the read memory access request is accepted by the memory management unit MMU, the method subsequently comprises reading 303 by the memory management unit MMU the at least one pixel saved in the framebuffer MEMI, via the bus BS2. For this, the memory management unit MMU first of all translates the virtual address specified in the memory access request into a physical address of the framebuffer MEMI.

The method subsequently comprises modifying 304 by the memory management unit MMU the format of the at least one read pixel by adding thereto a byte so as to format the at least one pixel on thirty-two bits.

Then, the method comprises transmitting 305 the at least one pixel on thirty-two bits by the memory management unit MMU to the master module MM.

FIG. 4 illustrates a method for writing at least one pixel in a framebuffer that may be implemented by the computer system SYS described above.

The method comprises emitting 401 by a master module MM a write access request to the framebuffer. This write access request is transmitted to the memory management unit MMU via the first bus BS1. This read access request indicates the value of the components of a pixel to be written in the framebuffer MEMI. The pixel then has a format on 32 bits comprising the three colour components of the pixel, each coded on 8 bits, as well as an additional byte. The access request may also be carried out for a plurality of writings for various pixels. The read access request also specifies a virtual address to be accessed.

Thus, the method comprises receiving 402 the read access request by the memory management unit MMU. The memory management unit MMU then controls the write access request in order to authorise or not the write access to the framebuffer MEMI.

If the write memory access request is accepted by the memory management unit MMU, the method subsequently comprises modifying 403 by the memory management unit MMU the format of the at least one pixel by deleting the additional byte so as to format the at least one pixel on twenty-four bits. Furthermore, the memory management unit also translates the virtual address specified in the memory access request into a physical address of the framebuffer.

Then, the method comprises saving 404 by the memory management unit MMU the at least one pixel on twenty-four bits in the framebuffer MEMI at the physical address of the memory calculated, via the second bus BS2.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A computer system comprising:
a first circuit configured to process data having a format of N bits, the first circuit comprising a central processor, a graphics processor, and a display;
a framebuffer configured to store pixel color component values of an image, the framebuffer having a resolution of N bits, each pixel being coded on P bits in the framebuffer and the pixels being stored one after another in the framebuffer; and
a memory management circuit configured to control memory accesses of the first circuit to the framebuffer, wherein the memory management circuit is further configured to:
receive read memory access requests from the first circuit,
read a pixel in the framebuffer saved on P bits, and
modify the format of the pixel by adding Q additional bits equal to a difference between N and P to format the pixel on N bits before transmitting the pixel to the first circuit, wherein the Q additional bits comprise padding bits without color component information.

2. The system according to claim 1, wherein N is equal to thirty-two, P is equal to twenty-four, and wherein a value of each color component of each pixel is coded on eight bits so that Q is equal to eight.

3. The system according to claim 1, wherein each memory access request specifies a virtual address corresponding to a physical address to access the framebuffer.

4. The system according to claim 3, wherein the memory management circuit is configured to convert the virtual address into the corresponding physical address of the framebuffer.

5. The system according to claim 1, wherein the memory management circuit comprises a buffer configured to store the pixels received from the first circuit during a write access.

6. The system according to claim 1, wherein the memory management circuit comprises a cache memory configured to store the last read pixel in the framebuffer.

7. A computer system comprising:
a first circuit configured to process data having N bits, the first circuit comprising a central processor, a graphics processor, and a display;
a framebuffer configured to store pixel color component values of an image, the framebuffer having a resolution of N bits, each pixel being coded on P bits in the framebuffer and the pixels being stored one after another in the framebuffer; and a memory management circuit configured to control memory accesses of the first circuit to the framebuffer, wherein the memory management circuit is further configured to:

receive write memory access requests from a pixel having a format on N bits including color component values of the pixel as well as Q additional bits equal to a difference between N and P, wherein the Q additional bits comprise padding bits without color component information, modify the format of the pixel by deleting the Q additional bits to format the pixel on P bits before saving the pixel in the framebuffer, and save the pixel in the framebuffer.

8. The system according to claim 7, wherein N is equal to thirty-two, P is equal to twenty-four, a value of each color component of each pixel being coded on eight bits so that Q is equal to eight.

9. The system according to claim 7, wherein each memory access request specifies a virtual address corresponding to a physical address to access the framebuffer.

10. The system according to claim 9, wherein the memory management circuit is configured to convert the virtual address into the corresponding physical address of the framebuffer.

11. The system according to claim 7, wherein the memory management circuit comprises at least one buffer configured to store the pixels received from the first circuit during a write access.

12. A method for reading a pixel in a framebuffer based on a read access request emitted by a first circuit, wherein the first circuit is configured to process data having N bits, the first circuit comprising a central processor, a graphics processor, and a display, wherein the framebuffer is configured to store pixel color component values of an image and has a resolution of N bits, wherein each pixel is coded on P bits in the framebuffer, and wherein the pixels are stored one after another in the framebuffer, the method comprising:

receiving, by a memory management circuit, a read memory access request from the first circuit to the framebuffer;

reading, by the memory management circuit, the pixel in the framebuffer saved on P bits;

after reading, modifying, by the memory management circuit, a format of the at pixel by adding Q additional bits equal to a difference between N and P to format the pixel on N bits, wherein the Q additional bits comprise padding bits without color component information; and after modifying, transmitting, by the memory management circuit, the pixel on N bits to the first circuit.

13. The method according to claim 12, wherein N is equal to thirty-two, P is equal to twenty-four, and wherein a value of each color component of each pixel is coded on eight bits so that Q is equal to eight.

14. The method according to claim 12, wherein each memory access request specifies a virtual address corresponding to a physical address to access the framebuffer.

15. The method according to claim 14, wherein reading comprises translating, by the memory management circuit, the virtual address specified in the memory access request into a physical address of the framebuffer.

16. A method for writing a pixel in a framebuffer based on a write access request emitted by a first circuit, wherein the first circuit is configured to process data having N bits, the first circuit comprising a central processor, a graphics processor, and a display, wherein the framebuffer is configured to store pixel color component values of an image and has a resolution of N bits, wherein each pixel is coded on P bits in the framebuffer, and wherein the pixels are stored one after another in the framebuffer, the method comprising:

receiving, by a memory management circuit, a write memory access request from the first circuit to the framebuffer, the write access request specifying a pixel to write having a format on N bits including the color component values of the pixel on P bits as well as Q additional bits equal to a difference between N and P, wherein the Q additional bits comprise padding bits without color component information;

modifying, by the memory management circuit, the format of the pixel by deleting the Q additional bits to format the pixel on P bits; and after modifying, saving, by the memory management circuit, the pixel on P bits in the framebuffer.

17. The method according to claim 16, wherein N is equal to thirty-two, P is equal to twenty-four, and wherein a value of each color component of each pixel is coded on eight bits so that Q is equal to eight.

18. The method according to claim 16, wherein each memory access request specifies a virtual address corresponding to a physical address to access the framebuffer.

19. The method according to claim 18, wherein reading comprises translating, by the memory management circuit, the virtual address specified in the memory access request into a physical address of the framebuffer.

20. The method according to claim 16, wherein the memory management circuit comprises an address channel configured to convert virtual addresses into physical addresses, a write channel configured to modify the format of pixels from N bits to P bits, and a read channel configured to modify the format of pixels from P bits to N bits.

* * * * *